(12) United States Patent
Ekin

(10) Patent No.: US 10,854,072 B2
(45) Date of Patent: Dec. 1, 2020

(54) SYSTEM AND METHOD FOR AUTOMATIC CALIBRATION OF VEHICLE POSITION DETERMINING DEVICE IN A TRAFFIC SYSTEM

(71) Applicant: Akif Ekin, Istanbul (TR)

(72) Inventor: Akif Ekin, Istanbul (TR)

( * ) Notice: Subject to any disclaimer, the term of this patent is extended or adjusted under 35 U.S.C. 154(b) by 253 days.

(21) Appl. No.: 16/132,474

(22) Filed: Sep. 17, 2018

(65) Prior Publication Data

US 2020/0035094 A1 Jan. 30, 2020

(30) Foreign Application Priority Data

Jul. 27, 2018 (TR) ............... a 2018 10877

(51) Int. Cl.
| | |
|---|---|
| *G06K 9/00* | (2006.01) |
| *H04N 7/18* | (2006.01) |
| *G08G 1/017* | (2006.01) |
| *G08G 1/054* | (2006.01) |
| *G08G 1/01* | (2006.01) |
| *G08G 1/04* | (2006.01) |
| *G08G 1/00* | (2006.01) |

(52) U.S. Cl.
CPC ........... *G08G 1/0175* (2013.01); *G08G 1/054* (2013.01); *G08G 1/0125* (2013.01); *G08G 1/04* (2013.01); *G08G 1/20* (2013.01)

(58) Field of Classification Search
USPC ................................. 382/104, 107; 348/142
See application file for complete search history.

(56) References Cited

U.S. PATENT DOCUMENTS

| | | | | |
|---|---|---|---|---|
| 2006/0177099 A1* | 8/2006 | Zhu | ..................... | G06K 9/00664 382/104 |
| 2009/0046897 A1* | 2/2009 | Rowsell | ................... | G08G 1/04 382/107 |
| 2013/0038681 A1* | 2/2013 | Osipov | .................. | G08G 1/054 348/36 |
| 2013/0201039 A1* | 8/2013 | Gartner | .................. | G08G 1/015 340/989 |
| 2013/0266185 A1* | 10/2013 | Bulan | ................ | G06K 9/00771 382/104 |

(Continued)

*Primary Examiner* — Kathleen Y Dulaney
(74) *Attorney, Agent, or Firm* — Bayramoglu Law Offices LLC

(57) ABSTRACT

An automatic calibration system for a traffic system includes at least one position determining device, at least one image capturing device, a matching and tagging module, an image analysis module, and a calibration module. The position determining device detects a vehicle in violation of traffic rules and activates the image capturing device to capture images of the vehicle. The vehicle is matched and tagged in the images according to vehicle-related information detected by the position determining device by the matching and tagging module. The image analysis module analyses a plurality of images selected from the images to obtain an analysis result. The analysis result is compared with the vehicle-related information by a processor. If the analysis result is different than the vehicle-related information, the position determining device is calibrated by the calibration module. If the analysis result is the same as the vehicle-related information, a calibration is not performed.

11 Claims, 3 Drawing Sheets

(56) References Cited

U.S. PATENT DOCUMENTS

| | | | | |
|---|---|---|---|---|
| 2014/0028840 A1* | 1/2014 | Zarubin | ................ | G08G 1/054 |
| | | | | 348/142 |
| 2016/0034778 A1* | 2/2016 | Wang | .................. | G08G 1/0175 |
| | | | | 382/105 |
| 2018/0137754 A1* | 5/2018 | Alon | ....................... | G06T 7/251 |

* cited by examiner

SYSTEM AND METHOD FOR AUTOMATIC CALIBRATION OF VEHICLE POSITION DETERMINING DEVICE IN A TRAFFIC SYSTEM

CROSS REFERENCE TO RELATED APPLICATIONS

This application is based upon and claims priority to Turkish Patent Application No. 2018/10877, filed on Jul. 27, 2018, the entire contents of which are incorporated herein by reference.

TECHNICAL FIELD

The present invention relates to the field of traffic system, and particularly to a system and a method for automatic calibration of a vehicle position determining device in a traffic system which can determine the precise position of a vehicle in violation of traffic rules.

BACKGROUND

Nowadays, several methods and systems are used for determining traffic violations and the location of the vehicle in violation of traffic rules. Currently available systems determine the location of the vehicle in violation of traffic rules by using the location information obtained from a radar. In order to make such information more precise, the user needs to carry out many operations manually.

The location data of a moving vehicle can be obtained from the radar and it can be seen on the radar screens. Generally, the location data of the vehicle obtained from the radar is provided to the user, but the location data of the moving vehicle obtained from the radar itself is not meaningful and precise enough for the user. In conventional calibration methods, the user needs to manually mark the locations, where the vehicle in violation of traffic rules is located, several times on the camera image in order to increase precision. Such calibration methods are time consuming, inefficient, and have low accuracy. Therefore, an automatic calibration system which can calibrate the location information of the vehicle in violation obtained from the radar is needed to make sure that the traffic violation tracking system provides the user with precise location information of the vehicle in violation of traffic rules in a faster and effortless way.

SUMMARY

One objective of the present invention is to provide an automatic calibration system for determining the precise position of a vehicle that is being driven in violation of traffic rules. With the automatic calibration system, a user does not need to carry out extra operations in order to get the precise location of the vehicle. Also, the precise location of the vehicle can be provided to the user automatically, thus no manual operation is required. However, if the user still wants to perform manual operations, the system allows manual operations also.

In a preferred embodiment, the present invention provides a system for automatic calibration of a position determining device in a traffic system which includes at least one position determining device, at least one image capturing device, a matching and tagging module, an image analysis module, and a calibration module. The position determining device detects a vehicle in violation of a traffic rule and activates the image capturing device to capture images of the vehicle. The vehicle is matched and tagged in the images according to vehicle-related information detected by the position determining device by the matching and tagging module. The image analysis module analyses a plurality of images selected from the images of the vehicle to obtain an analysis result. The analysis result is compared with the vehicle-related information detected by the position determining device by a processor to obtain a comparison result. The calibration module is configured to calibrate the position determining device according to the comparison result.

In an alternative implementation, the plurality of images includes a first image captured at first time point right before a to-be-analysed image captured at a second time point and a second image captured at a third time point right after the to-be-analysed image. The image analysis module analyses a first pixel difference between the first image and the to-be-analysed image, and a second pixel difference between the second image and the to-be-analysed image to determine an area with a largest pixel difference on the to-be-analysed image, the first image and the second image; and the image analysis module marks the area as a precise location of the vehicle on the to-be-analysed image, the first image and the second image. The image analysis module is configured to calculate a difference in the precise location of the vehicle on the to-be-analysed image, the first image and the second image to determine a relative movement of the vehicle between the first time point, the second time point and the third time point.

In an alternative implementation, the vehicle-related information detected by the position determining device includes a difference in positions of the vehicle at the first time point, the second time point and the third time point.

In an alternative implementation, the first image, the to-be-analysed image and the second image are consecutive images captured by the image capturing device.

In an alternative implementation, the position determining device includes at least one radar.

In an alternative implementation, the image capturing device includes at least one camera.

In an alternative implementation, the vehicle-related information detected by the position determining device further includes position information of the vehicle relative to the position determining device, a velocity of the vehicle, a heading direction of the vehicle, and a shape of the vehicle.

In an alternative implementation, the automatic calibration system of the present invention further includes a remote managing and monitoring module which enables a user to simultaneously manage and monitor vehicles in a plurality of locations from a control centre.

In an alternative implementation, the automatic calibration system is configured to calibrate the position determining device based on an input received from a user.

In a preferred embodiment, the present invention provides an automatic calibration method for position determining device of a traffic system which includes activating an image capturing device to capture images of a vehicle in violation of a traffic rule when a position determining device detects a vehicle is in violation of the traffic rule; matching and tagging, by a matching and tagging module, the vehicle in the images according to vehicle-related information detected by the position determining device; analysing, by an image analysis module, a plurality of images selected from the images of the vehicle captured by the capturing device to obtain an analysis result, wherein the image analysis module analyses a pixel difference between adjacent images to determine an area with a largest pixel difference as a precise location of the vehicle on each image, and the image analysis module is configured to calculate a difference in the precise location of the two adjacent images to obtain the analysis result; comparing, by a processor, the analysis result with the vehicle-related information detected by the position determining device to obtain a comparison result. If the analysis result is different than the vehicle-related information, the position determining device is calibrated by a calibration module according to the comparison result.

In an alternative implementation, the plurality of images includes a first image captured at a first time point right before a to-be-analysed image captured at a second time point and a second image captured at a third time point right after the to-be-analysed image. The method further includes comparing the first image and the to-be-analysed image to obtain a first pixel difference between the first image and the to-be-analysed image and comparing the second image and the to-be-analysed image to obtain a second pixel difference between the second image and the to-be-analysed image to determine an area with a largest pixel difference on the to-be-analysed image, the first image and the second image; marking the area as a precise location of the vehicle on the to-be-analysed image, the first image and the second image; and calculating a difference in the precise location of the vehicle on the to-be-analysed image, the first image and the second image to determine a relative movement of the vehicle between the first time point, the second time point and the third time point.

In an alternative implementation, the vehicle-related information detected by the position determining device includes a difference in positions of the vehicle at the first time point, the second time point and the third time point.

In an alternative implementation, the first image, the to-be-analysed image and the second image are consecutive images captured by the image capturing device.

In an alternative implementation, the position determining device includes at least one radar.

In an alternative implementation, the image capturing device includes at least one camera.

In an alternative implementation, the vehicle-related information detected by the position determining device further includes position information of the vehicle relative to the position determining device, a velocity of the vehicle, a heading direction of the vehicle, and a shape of the vehicle.

The present invention has the following advantages:

By comparing pixel difference of consecutive images, a precise location of a vehicle in violation of traffic rules is found on the images captured by any image capturing device. Since at the same time point, the position determining device (such as radar) also detects the relative position information (but not limited thereto) of the vehicle in violation of the traffic rules, a difference in the position of the vehicle detected by the position determining device at selected time points should equal to the difference in the precise location of the same vehicle on consecutive images captured at the same time points. Based on this principle, in present invention, the position determining device is calibrated accordingly if the position difference of the vehicle detected by the position determining device at selected time points not equals to the position difference of the same vehicle on consecutive images captured at the same time points. If the position difference of the vehicle detected by the position determining device at selected time points equals to the position difference of the same vehicle on consecutive images captured at the same time points, the calibration is not performed. Therefore, the location data sent to the user from the position determining device is more precise, and since the calibration may be performed automatically or manually, the system is more convenient, reliable, efficient, and faster.

DETAILED DESCRIPTION OF THE EMBODIMENTS

Figure 1:
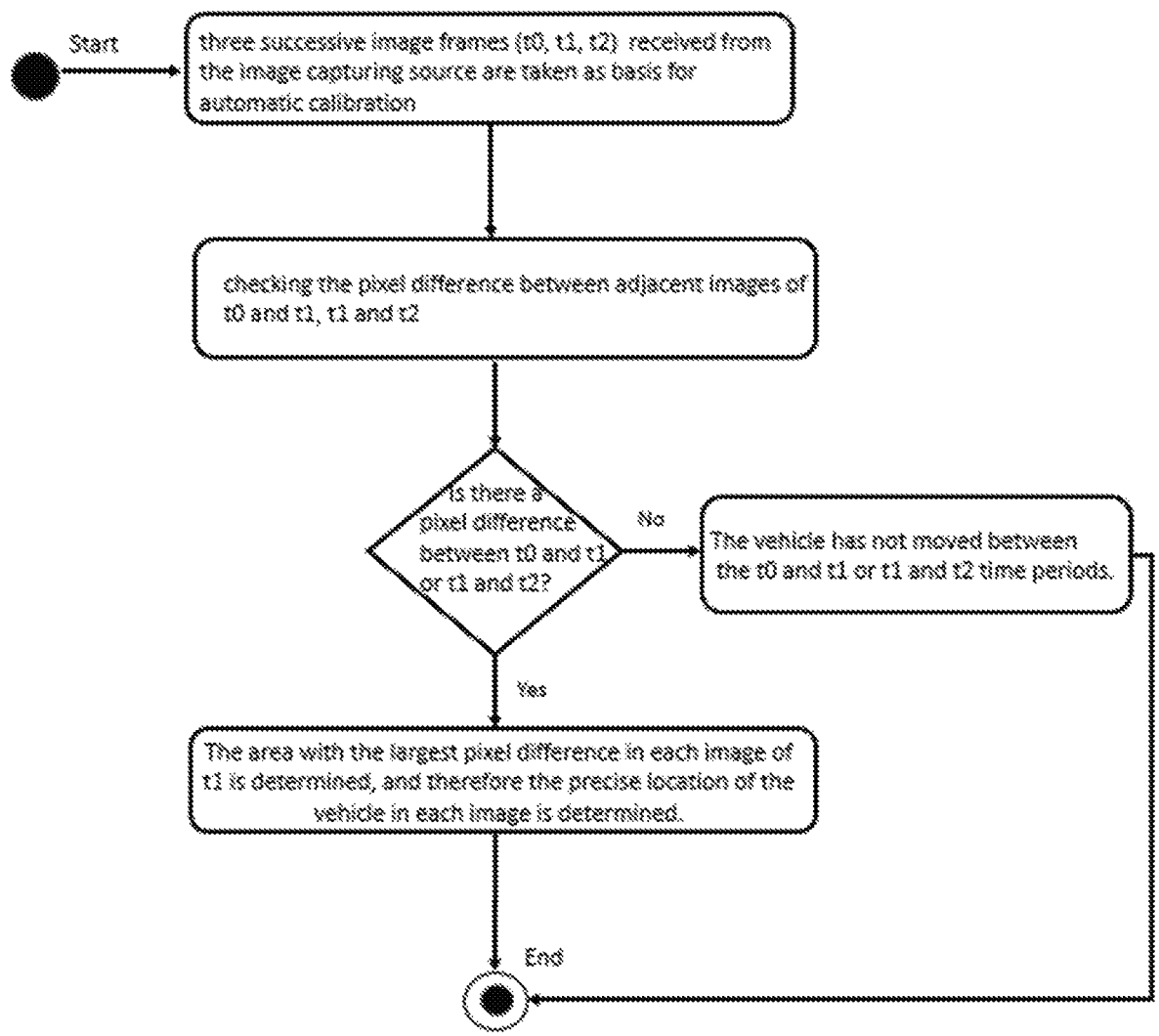
FIG. 1 is a flow chart showing the process of determining the precise location of a vehicle in violation of traffic rules on images captured by a camera.
Figure 2:
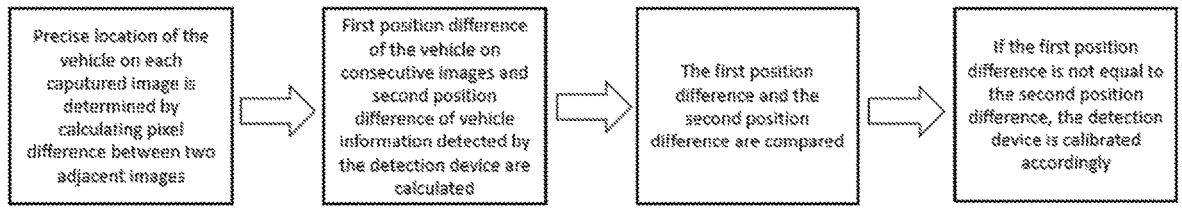
FIG. 2 is a flow chart showing the automatic calibration process.
Figure 3:
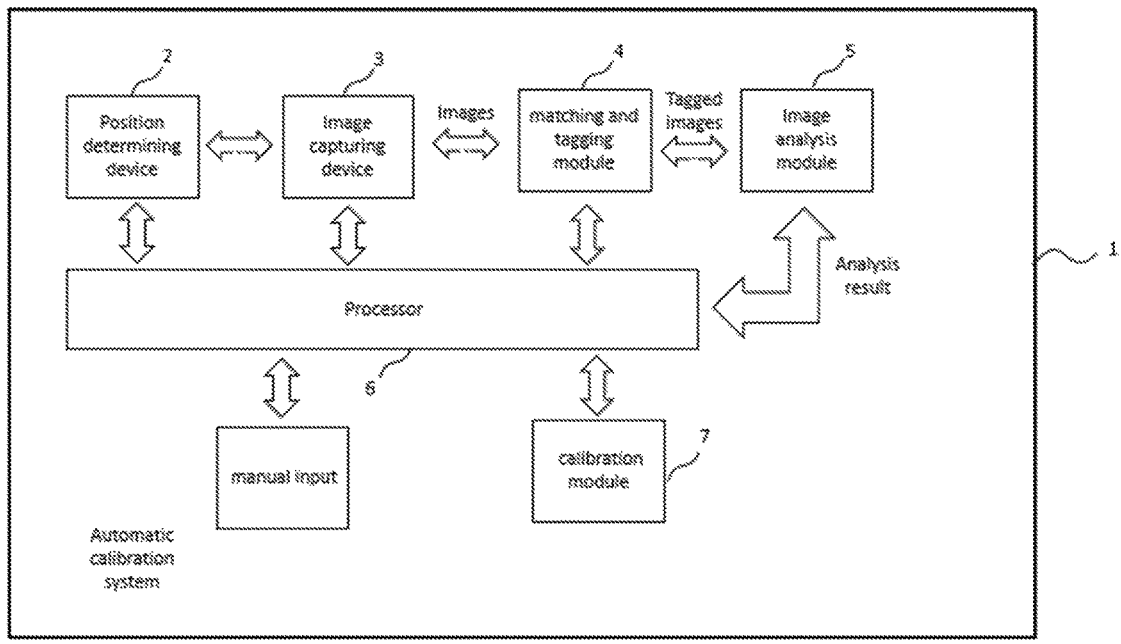
FIG. 3 is a diagram of an automatic calibration system according to one embodiment of the present invention.
Figure 4:
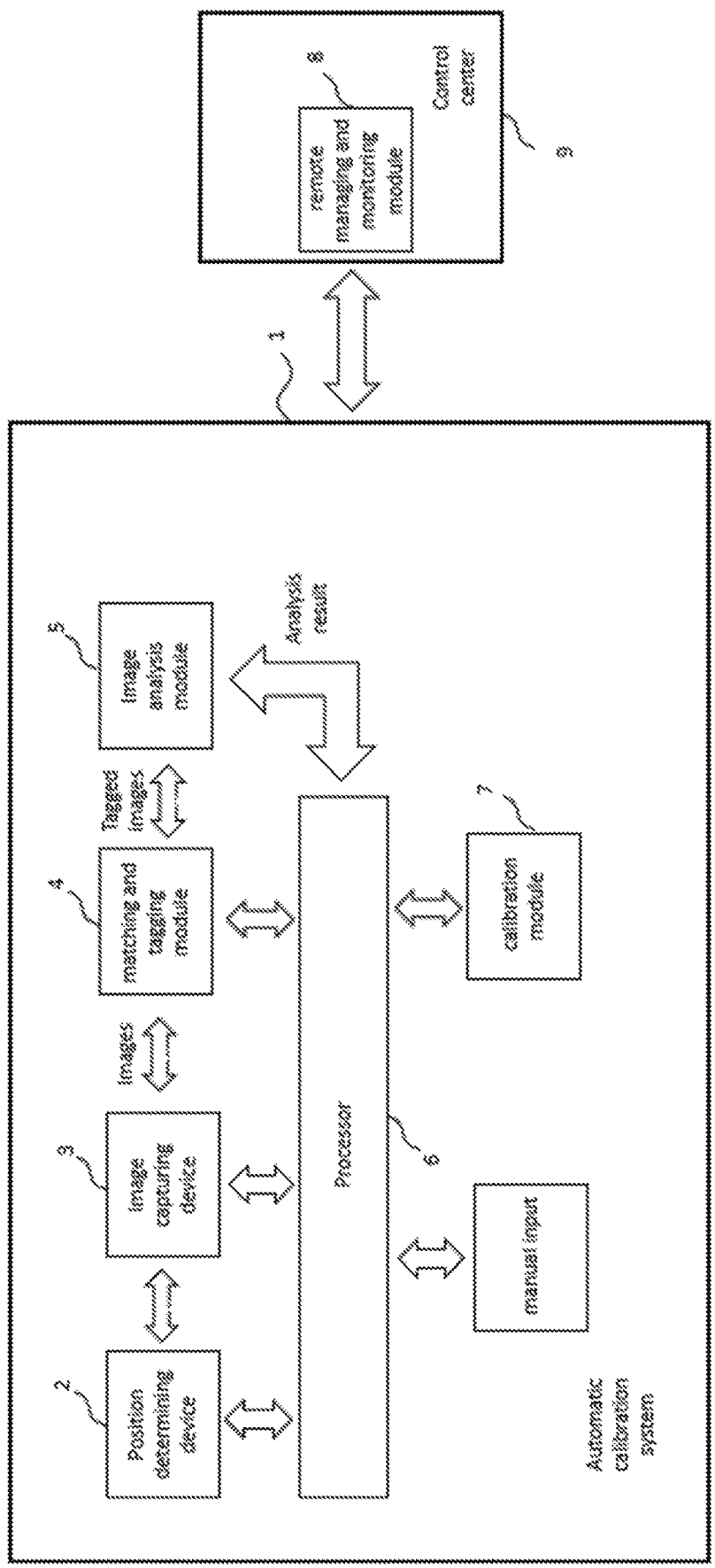
FIG. 4 is a diagram of an automatic calibration system according to another embodiment of the present invention.

The present invention will now be described in further detail with reference to the accompanying drawings.

In a typical configuration of the present invention, each of the terminal, the service network of the device, and the trusted party includes one or more processors (CPU), input/output interfaces, network interfaces, and memory.

The memory may include the forms of non-permanent memory, random access memory (RAM), and/or nonvolatile memory etc. in computer-readable media, such as read-only memory (ROM) or flash memory (flash RAM). Memory is an example of a computer-readable medium.

The computer-readable media including both permanent and non-permanent, and removable and non-removable media can be implemented to realize the information storage by any method or technology. Examples of storage media for a computer include, but are not limited to, phase change memory (PRAM), static random access memory (SRAM), dynamic random access memory (DRAM), other types of random access memory (RAM), read only memory (ROM), electrically erasable programmable read-only memory (EEPROM), flash memory or other memory technology, read-only optical disk read-only memory (CD-ROM), digital versatile disc (DVD) or other optical storage, magnetic tape cartridge, a magnetic tape storage or other magnetic storage device or any other non-transmission medium, which can be used to store information that can be accessed by the computing device. As defined herein, the computer-readable medium does not include non-temporary computer-readable media (i.e. non-transitory media), such as modulated data signals and carriers.

The automatic calibration system of the present invention enables to determine the precise location of the vehicles found by the position determining device (e.g. radar) to be in violation of the traffic rules, such as the vehicles exceeding the speed limits, or jumping a red light on the image captured by the image capturing device (e.g. camera) automatically. Also, the automatic calibration system of the present invention can calibrate position information detected by the position determining device according to the precise location of the vehicle determined on the images.

In a preferred embodiment, the present invention provides a system for automatic calibration 1 of a position determining device in a traffic system which includes at least one position determining device 2, at least one image capturing device 3, a matching and tagging module 4, an image analysis module 5, and a calibration module 7. The position determining device 2 detects a vehicle in violation of a traffic rule and activates the image capturing device 3 to capture images of the vehicle. The vehicle is matched and tagged in the images according to vehicle-related information detected by the position determining device by the matching and tagging module 4. The image analysis module 5 analyses a plurality of images selected from the images of the vehicle 5 to obtain an analysis result. The analysis result is compared with the vehicle-related information detected by the position determining device 2 to obtain a comparison result. The position determining device 2 is calibrated by a calibration module 7 according to the comparison result.

For the same vehicle whose successive/consecutive images have been obtained from the image capturing source as below.

- t0: an image frame right before the image frame where the vehicle is located.
- t1: an actual image frame where the vehicle is located, which is taken as a reference point.
- t2: a next image frame following the image frame where the vehicle is located.
- t0, t1, t2 are the time stamps or the time points corresponding to the image frames.

The plurality of images includes a first image captured at first time point t0 right before a to-be-analysed image captured at a second time point t1 and a second image captured at a third time point t2 right after the to-be-analysed image t1. The image analysis module 5 analyses a first pixel difference between the first image and the to-be-analysed image, and a second pixel difference between the second image and the to-be-analysed image to determine an area with a largest pixel difference on the to-be-analysed image, the first image and the second image, and the image analysis module 5 marks the area as a precise location of the vehicle on the to-be-analysed image, the first image and the second image. The image analysis module 5 is configured to calculate a difference in the precise location of the vehicle on the to-be-analysed image, the first image and the second image to determine a relative movement of the vehicle between the first time point to, the second time point t1 and the third time point t3.

The pixel difference of the images and the position difference of the vehicle in the images are performed by the image analysis module 5. After the precise location of the vehicle on the plurality of images are determined, a first position difference of the vehicle on at least two consecutive images is calculated by the image analysis module to obtain a relative movement of the vehicle referred as the analysis result.

Then, second position differences of position information of the same vehicle detected by the radar at the same time points t0, t1, t2, are calculated, respectively. The first position difference of the vehicle on the images is compared with the second position difference of the position information of the vehicle detected by the position determining device 2 by a processor 6. If the first position difference is different than the second position difference, the position determining device is calibrated by the calibration module 7. If the first position difference is the same as the second position difference, a calibration is not performed.

The position determining device 2 may be a radar or any other device that can detect information relative to the vehicles in violation of traffic rules, such as position information of the vehicle relative to the position determining device 2, velocity of the vehicle, heading direction of the vehicle, and shape of the vehicle, etc.

The image capturing device 3 may include one or more camera or any other device that can capture images or record videos.

The automatic calibration system 1 of the present invention may further include a remote managing and monitoring module 8 which enables a user to manage and monitor the vehicles at a plurality of locations from a control centre 9.

The automatic calibration system is configured to calibrate the position determining device based on an input received from a user.

In a preferred embodiment, the present invention further provides an automatic calibration method for a traffic system which includes the following steps.

The position determining device 2 detects a vehicle in violation of traffic rules and activates the image capturing device 3 to capture images of the vehicle in violation of traffic rules. The vehicle is matched and tagged in the images according to vehicle-related information detected by the position determining device 2 by the matching and tagging module 4. The image analysis module 5 analyses a plurality of images selected from an image source of the image capturing device 3 to obtain an analysis result. The analysis result is compared with the vehicle-related information detected by the position determining device 2 by a processor 6 to obtain a comparison result. If the analysis result is different than the vehicle-related information, the position determining device 2 is calibrated by the calibration module 7 according to the comparison result. If the analysis result is the same as the vehicle-related information, a calibration is not performed.

For the same vehicle whose successive/consecutive images have been obtained from the image capturing source as below.

- t0: an image frame right before the image frame where the vehicle is located.
- t1: an actual image frame where the vehicle is located, which is taken as a reference point.
- t2: a next image frame following the image frame where the vehicle is located.
- t0, t1, t2 are the time stamps or the time points corresponding to the image frames.

The plurality of images includes a first image captured at first time point t0 right before a to-be-analysed image captured at a second time point t1 and a second image captured at a third time point t2 right after the to-be-analysed image t1. The image analysis module 5 analyses a first pixel difference between the first image and the to-be-analysed image, and a second pixel difference between the second image and the to-be-analysed image to determine an area with a largest pixel difference on the to-be-analysed image, the first image and the second image, and the image analysis module 5 marks the area as a precise location of the vehicle on the to-be-analysed image, the first image and the second image. The image analysis module 5 is configured to calculate a difference in the precise location of the vehicle on the to-be-analysed image, the first image and the second image to determine a relative movement of the vehicle between the first time point to, the second time point t1 and the third time point t3.

The pixel difference of the images and the position difference of the vehicle in the images are performed by the image analysis module 5. After the precise location of the vehicle on the plurality of images are determined, a first position difference of the vehicle on at least two consecutive images is calculated by the image analysis module 5 to obtain a relative movement of the vehicle referred as the analysis result.

Then, second position differences of position information of the same vehicle detected by the radar at the same time points t0, t1, t2, are calculated, respectively. The first position difference of the vehicle on the images is compared with the second position difference of the position information of the vehicle detected by the position determining device 2 by a processor 6. If the first position difference is different than the second position difference, the position determining device is calibrated by the calibration module 7. If the first position difference is the same as the second position difference, a calibration is not performed.

The position determining device 2 may be a radar or any other device that can detect information relative to the vehicles in violation of traffic rules, such as position information of the vehicle relative to the position determining device 2, velocity of the vehicle, heading direction of the vehicle, and shape of the vehicle, etc.

The image capturing device 3 may include one or more camera or any other device that can capture images or record videos.

The automatic calibration system 1 of the present invention may further include a remote managing and monitoring module 8 which enables a user to manage and monitor vehicles at a plurality of locations from a control centre 9.

The automatic calibration system is configured to calibrate the position determining device based on an input received from a user.

The communication of all the modules and components may be performed through wireless communication, CAN bus, or any other proper method.

Apparently, without departing from the spirit and scope of the present invention, those skilled in the art can make various modifications and variations to the present invention. In this manner, if the modifications and variations of the present invention fall within the scope of the appended claims and the equivalents thereof, the present invention is intended to include these modifications and variations.

It should be noted that the present invention may be implemented in software and/or the combination of software and hardware, for example, the present invention can be implemented by means of application specific integrated circuit (ASIC), general purpose computer, or any other similar hardware device. In one embodiment, the software program of the present invention may be executed by a processor to realize the steps or functions described above. Similarly, the software program (including the associated data structure) of the present invention may be stored in a computer readable recording medium, such as a RAM memory, a magnetic or optical driver, or a floppy disk and the like. In addition, some of the steps or functions of the present invention may be implemented by means of hardware, for example, the circuit in combination with the processor to perform each step or function.

In addition, the present invention may be partially applied as a computer program product, for example, when the part of the present invention is implemented by a computer, the method and/or technical solution of the present invention may be invoked or provided according to the operation of the computer. Moreover, the program instructions that invoke the method of the present invention may be stored in a fixed or removable recording medium, an/or transmitted through broadcasting or the data stream in other signal-carrying medium, and/or stored in a work storage of the computer device operated according to the program instructions. Here, an apparatus is provided according to one embodiment of the present invention, the apparatus includes a memory configured for storing the computer program instructions and a processor configured for executing the program instructions, wherein, when the computer program instructions are executed by the processor, the apparatus is triggered to operate the method and/or technical solution based on the various foregoing embodiments of the present invention.

It will be apparent to those skilled in the art that the present invention is not limited to the details of the above-mentioned exemplary embodiments, and without departing from the spirit or essential features, the present invention may be practiced in other specific forms. Accordingly, the embodiments should be exemplarily considered in any aspect and are non-restrictive. The scope of the invention is defined by the appended claims rather than the foregoing description. Therefore the present invention intended to include all variations of the meaning and scope of the equivalent elements falling within the scope of the present invention. In addition, it is clear that the term "including" does not exclude other units or steps, and the singular does not exclude the plural. The plurality of elements or devices described in the device claims may also be implemented by software or hardware via one unit or device. The terms of first, second and other words are used to express the name rather than indicating any specific order.

What is claimed is:

1. A system for automatic calibration of a position determining device in a traffic system comprising:
   at least one position determining device;
   at least one image capturing device;
   a matching and tagging module;
   an image analysis module; and
   a calibration module;
   wherein, the position determining device detects a vehicle in violation of a traffic rule and activates the image capturing device to capture images of the vehicle;
   the vehicle is matched and tagged in the images according to vehicle-related information detected by the position determining device by the matching and tagging module;
   the image analysis module analyses a plurality of images selected from the images of the vehicle to obtain an analysis result;
   the analysis result is compared with the vehicle-related information detected by the position determining device by a processor to obtain a comparison result; and
   the calibration module is configured to calibrate the position determining device according to the comparison result wherein,
   the plurality of images comprises a first image captured at first time point right before a to-be-analysed image captured at a second time point and a second image captured at a third time point right after the to-be-analysed image;
   the image analysis module analyses a first pixel difference between the first image and the to-be-analysed image, and a second pixel difference between the second image and the to-be-analysed image to determine an area with a largest pixel difference on the to-be-analysed image, the first image and the second image; and the image analysis module marks the area as a precise location of the vehicle on the to-be-analysed image, the first image and the second image; and
   the image analysis module is configured to calculate a difference in the precise location of the vehicle on the to-be-analysed image, the first image and the second image to determine a relative movement of the vehicle between the first time point, the second time point and the third time point.

2. The system of claim 1 wherein, the vehicle-related information detected by the position determining device comprises a difference in positions of the vehicle at the first time point, the second time point and the third time point.

3. The system of claim 2 wherein,
the vehicle-related information detected by the position determining device further comprises position information of the vehicle relative to the position determining device, a velocity of the vehicle, a heading direction of the vehicle, and a shape of the vehicle.

4. The system of claim 1 wherein;
the first image, the to-be-analysed image and the second image are consecutive images captured by the image capturing device.

5. A method for automatic calibration of a position determining device of a traffic system comprising:
activating an image capturing device to capture images of a vehicle in violation of a traffic rule when a position determining device detects a vehicle is in violation of the traffic rule;
matching and tagging, by a matching and tagging module, the vehicle in the images according to vehicle-related information detected by the position determining device;
analysing, by an image analysis module, a plurality of images selected from the images of the vehicle captured by the capturing device to obtain an analysis result, wherein the image analysis module analyses a pixel difference between adjacent images to determine an area with a largest pixel difference as a precise location of the vehicle on each image, and the image analysis module is configured to calculate a difference in the precise location of the two adjacent images to obtain the analysis result; and
comparing, by a processor, the analysis result with the vehicle-related information detected by the position determining device to obtain a comparison result;
wherein, if the analysis result is different than the vehicle-related information, calibrating the position determining device by a calibration module according to the comparison result;
wherein, the matching and tagging of the vehicle is performed after the precise location of the vehicle on each image is determined.

6. The method of claim 5, wherein,
the plurality of images comprises a first image captured at a first time point right before a to-be-analysed image captured at a second time point and a second image captured at a third time point right after the to-be-analysed image;
the method further comprises
comparing the first image and the to-be-analysed image to obtain a first pixel difference between the first image and the to-be-analysed image and comparing the second image and the to-be-analysed image to obtain a second pixel difference between the second image and the to-be-analysed image to determine an area with a largest pixel difference on the to-be-analysed image, the first image and the second image;
marking the area as a precise location of the vehicle on the to-be-analysed image, the first image and the second image; and
calculating a difference in the precise location of the vehicle on the to-be-analysed image, the first image and the second image to determine a relative movement of the vehicle between the first time point, the second time point and the third time point.

7. The method of claim 6 wherein,
the vehicle-related information detected by the position determining device comprises a position of the vehicle determined by the position determining device at the first time point, the second time point and the third time point.

8. The method of claim 7 wherein,
the vehicle-related information detected by the position determining device further comprises position information of the vehicle relative to the position determining device, a velocity of the vehicle, a heading direction of the vehicle, and a shape of the vehicle.

9. The method of claim 6 wherein,
the first image, the to-be-analysed image and the second image are consecutive images captured by the image capturing device.

10. The method of claim 5 wherein, the position determining device comprises at least one radar.

11. The method of claim 5 wherein, the image capturing device comprises at least one camera.

* * * * *